May 5, 1959

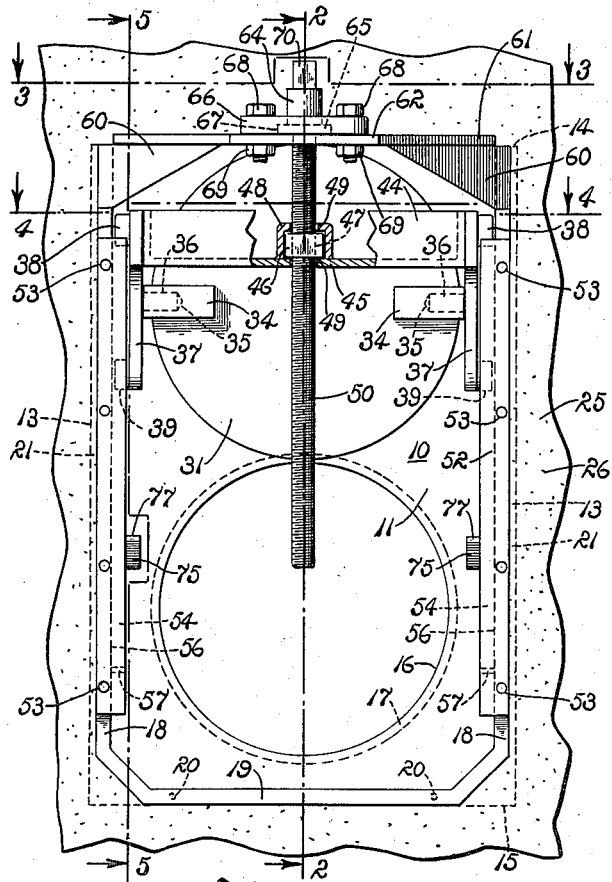

G. E. IRVING 2,885,175

GATE VALVES

Filed May 11, 1953

GEORGE E. IRVING
INVENTOR

HUEBNER, BEEHLER,
WORREL & HERZIG
ATTORNEYS

BY
Richard M. Norrel

United States Patent Office 2,885,175
Patented May 5, 1959

2,885,175

GATE VALVES

George E. Irving, Fresno, Calif., assignor to Nicholas G. Ragus, Reedley, Calif.

Application May 11, 1953, Serial No. 354,143

10 Claims. (Cl. 251—162)

The present invention relates to gate valves and more particularly to such a valve adapted to provide improved seating and releasing operation as compared with conventional valves for the purpose.

Gates valves are popularly employed in irrigation systems to regulate the flow of water therethrough. Such valves are usually integral portions of concrete stand pipes or the like and have valve plates movable between open and closed positions by a hand wheel or other suitable means. Such gates are notoriously subject to leakage which is objectionable not only because of the waste of water but because of resultant uneven irrigation and difficulties incident thereto such as the inability to cultivate entire irrigated areas at a given time because of uneven drying. Not only are such gates frequently subject to leakage when new, but rapid deterioration usually causes leakage even in those valves that initially are capable of resisting the water pressure to which they are subjected. Gate valves in irrigation systems conventionally employ valve plates that are movable to and from closing relation with valve seats associated therewith by sliding or rotating action. The abrasion between the plates and seats is such that leakage is soon encountered whether gaskets are employed between the plates and seats or bare metal engagement relied upon for sealing purposes. The usual presence of sand in irrigation water further aggravates the abrasion. Further, conventional gate valves are usually difficult to repair and expensive to produce.

An object of the present invention is, therefore, to provide an improved gate valve for irrigation systems and the like.

Another object is to provide a gate valve that obviates or minimizes slidable engagement between valve plates and seats associated therewith in gate valves.

Another object is to provide a gate valve employing a valve plate and a valve seat against which the plate is pressed for sealing purposes in which the plate is moved to and from seat engagement along a line of movement substantially normal to the plane of the seat.

Another object is to provide a gate valve particularly suited for incorporation into irrigation standpipes and the like which has improved pressure resisting characteristics.

Another object is to provide a gate valve which is economical to produce, durable in form, and which is quickly and easily disassembled for repair purposes and reassembled.

Further objects are to provide improved elements and arrangements thereof in a device of the character and for the purpose set forth.

Still further objects and advantages will become apparent in a subsequent description in the specification.

In the drawing:

Fig. 1 is a front elevation of an irrigation valve of the present invention shown supported in a fragmentarily illustrated standpipe.

Fig. 2 is a vertical section through the valve and standpipe taken on line 2—2 in Fig. 1 showing the valve in fully open position.

Fig. 3 is a horizontal section through a segment of the standpipe showing the irrigation valve in plan view, as seen from line 3—3 of Fig. 1.

Figures 4, 5:
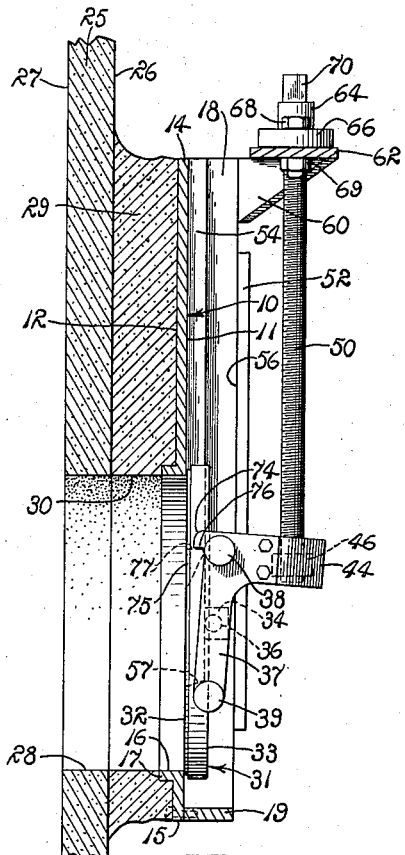
Fig. 4 is a horizontal section through both the segment of the standpipe and the irrigation valve, as taken on line 4—4 in Fig. 1 of the drawings.
Fig. 5 is a fragmentary vertical section through the valve and standpipe viewed from line 5—5 of Fig. 1 but showing the valve in closed position.

Referring in greater detail to the drawings:

The irrigation valve of the instant invention comprises a substantially rectangular base plate 10 having a front face 11, a rear face 12, parallel side edges 13, a top edge 14, and a bottom edge 15. A circular valve opening 16 is formed through the base plate near its bottom edge 13 and a substantially cylindrical flange 17 is extended axially rearwardly in circumscribing relation to the opening. Substantially parallel side rails 18 and a bottom rail 19 are attached to the front face 11 of the base plate at the side and bottom edges 13 and 15 thereof, respectively, by means of bolts 20. The side rails are located slightly inwardly from the edges of the base plate and leave marginal projections 21 at opposite sides of the base plate. Obviously the base plate and the side rails may be of unitary construction, if desired.

The irrigation valve is adapted to be secured to a supporting wall 25, which is illustrated in the form of a substantially cylindrical concrete irrigation standpipe in the drawings. The standpipe has an inner face 26 and an outer face 27 with a circular wall opening 28 formed therethrough. The base plate 10 is secured to the inner face 26 of the standpipe, or imbedded therein during formation of the standpipe, in chordal relation thereto by means of a seal 29, which may be a filler of cement or the like between the standpipe and the base plate. The seal embraces the projections 21 at the edges of the base plate maintaining the plate in place against the standpipe. The base plate is attached to the standpipe with the valve opening 16 in the base plate and the opening 28 in axial alignment. A seal opening 30 is provided in the seal 29 for the flow of liquid through the openings 16 and 28 when the valve is open.

The valve opening 16 is closable by a valve plate 31 which is circular in form and slightly larger than the valve opening. The valve plate has an inner face 32 adjacent to the base plate 10 and an opposite outer face 33 with a pair of bearing blocks 34 welded or otherwise secured in horizontal alignment to its outer face. Bores 35 are provided inwardly of the outer ends of the blocks which are adapted rotatably to receive trunnions 36. Elongated rocker arms 37 are mounted on the trunnions. Each of the rocker arms is provided with a pair of rollers, an upper roller 38 and a lower roller 39. Corresponding rollers on the rocker arms are in axial alignment.

An elongated bridge 44 interconnects the rocker arms 37 and has a central portion 45 spaced outwardly from the outer face of the valve plate. Resting on the central portion of the bridge is a nut 46 with a threaded bore 47 vertically therethrough. The nut is loosely retained against the bridge by a housing 48 enclosing the nut welded or otherwise secure to the bridge. Openings 49 are formed through both the housing and the bridge for the loose passage of a screw 50 therethrough. The screw is also threadedly receivable in the threaded bore in the nut.

The pair of rollers 38 and 39 on each rocker arm 37 are guided in vertical alignment by retainer rails 52 attached to the outer edges of the side rails 18 and projecting inwardly from the side rails. Attached longitudinally against the inner face of each of the side rails and against the outer face of the base plate is a guide bar 54 held in place by means of bolts 55. The side rails 18, the retainer rails 52, and the guide bars 54 define facing, parallel channel guideways 56 at each side of the base plate. The pair of rollers 38 and 39 are guided by rolling contact in the guideways. The guide bar 54 terminates at 57 at a distance below the horizontal axial center of the valve opening 16 slightly less than half the distance between the rollers 38 and 39 of each pair of rollers, for the purpose hereinafter described.

A pair of brackets 60 extend angularly outwardly and convergently from the upper ends of the side rails 18 with an anchor plate 61 secured horizontally therebetween. A central portion of the anchor plate is located above the nut 46 and an opening 63 is formed therethrough in vertical alignment with the nut. The upper end of the screw 50 is provided with an enlarged head 64 having a circumscribing flange 65 at its lower end. The flange rests on the upper surface of the anchor plate 61 with the screw extended downwardly through the opening 63 therein and threadedly through the nut 46. The flange is held downwardly close to the anchor plate by a bearing plate 66 having a recess 67 in its under side shaped to rotatably receive the flange. Bolts 68 pass through both the anchor plate and the bearing plate and each has a nut 69 threaded thereon to hold the bearing plate on the anchor plate. The screw, above the head 64, is formed to square or other polygonal cross section to be fitted with a hand wheel or wrench, not shown, whereby the screw may be rotated manually to raise or to lower the valve plate.

With the rollers 38 and 39 guided in the guideway 56, the valve plate is held in spaced relation to the outer face of the base plate, as illustrated in Fig. 2 of the drawing. The valve plate, however, is adapted to be forced inwardly against the face of the base plate when the valve plate is located symmetrically over the valve opening 16 in the base plate. This is permitted in part by the described termination 57 of the guide bar 54 whereby the lower rollers 39 may move inwardly toward the face of the base plate when the valve plate is in its lower position in juxtaposition to the valve opening. The valve plate is forcible against the base plate and in covering relation to the valve opening by an ear 74 formed integrally with the upper end of each rocker arm 37 and extended therefrom toward the face of the base plate. A lug 75 is attached to the inner face of each guide bar 54 in the vertical path of the ears 74. The ears have a horizontal lower edge 76 and the lugs each have a horizontal upper edge 77 whereby, as the valve plate is lowered to its lower position adjacent to the valve opening, the edges 76 and 77 are brought into engagement and by continued downward thrust on the nut 46 the valve plate is moved into seated engagement with the base plate 10 in covering relation to the opening 16.

*Operation*

The operation and utility of the present invention are believed to be apparent and are briefly summarized at this point. On manual rotation of the screw 50, the valve plate 31 may be moved to its upper open position, as illustrated in Fig. 2 of the drawings. In this position and in all positions of the valve plate except its closed position, the valve plate is spaced slightly from the outer face of the base plate by reason of both of the rollers 38 and 39 riding in the guideway 56.

The valve plate 31 is lowered to closed position by manual rotation of the screw 50 in the direction opposite to its direction of rotation for raising purposes. As the valve plate reaches its lowermost position symmetrically adjacent to the valve opening 14, the ears 74 engage the lugs 75 and downward thrust exerted on the nut 46 by continued rotation of the screw pivots the lower ends of the rocker arms 37 inwardly forcing the valve plate into seated engagement with the base plate 10 in covering relation to the opening 16. Inward movement of the lower rollers 39 is accommodated by the termination of the guide bars 54 in the positions described.

On manual rotation of the screw 50 to remove the valve plate 31 from base plate engagement, the downward pressure on the nut 46 and central portion 45 of the bridge 44 is relieved. It will be observed that the valve plate 31 cannot move upwardly until it has first moved outwardly from the base plate 10. As long as the valve plate is in seated engagement with the base plate, the lower rollers 39 are blocked from upward movement by the lower ends 57 of the guide bars 54. Said lower ends of the guide bars are outwardly inclined from the base plate so that as the screw 50 is rotated to lift the valve plate 31, the lower rollers 39 roll outwardly against the lower ends of the guide bars and into their respective guideways 56. Such outward movement of the lower rollers, pivots the rocker arms 37 outwardly removing the valve plate from the base plate and aligning the rollers with their guideways for upward movement of the valve plate to retracted position removed from the opening 16.

The leveraging effect exerted on the rocker arms 37 by downward thrust on the nut 46 captured in the housing 48 makes possible improved sealing of the opening 16 by the valve plate 31 as compared with conventional irrigation valves. Although no gasket has been shown on the inner face of the valve plate 31, it will be clearly apparent that such a gasket can be utilized, if desired. When such a gasket is employed, it will be apparent that it is subject to much less abrasion than gaskets in conventional irrigation valves which either rotate against a valve seat or slide thereagainst. Inasmuch as the valve plate 31 is moved directly to and from seated engagement with the base plate 10 in covering relation to the opening 16, no such rotating or sliding abrasion is encountered. Similarly, when no gasket is employed, the engageable surfaces of the valve plate and base plate are not damaged by relative sliding or rotational movement. This feature imparts a desired durability to the subject valve not heretofore available in irrigation valves.

The upper ends of the guideways 56 are open so that the rollers 38 and 39 may be moved upwardly therefrom when it is desired to disassemble the valve. The disassembly is conveniently made possible by removal of the nuts 69 so as to release the flange 65 of the screw 50 subsequent to which the screw can conveniently be unscrewed from the nut 46, and the valve plate 31, trunnion 36, rocker arms 37, and rollers 39 removed from the gate valve for repair or replacement purposes. It would appear that the bridge 44 would engage the anchor plate 61 and preclude disassembly in the manner described but such is not the case inasmuch as the upper rollers 38 are removable from the upper ends of the guideways 56, accommodating outward tipping of the rocker arms 37 to release the lower roller 39 from the guideways. Reassembly is conveniently effected by the reverse procedure.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A gate valve comprising a valve seat, a pair of substantially parallel guide members mounted on opposite sides of the seat in a plane transversely of the seat; a pair of spaced followers respectively mounted in each guide member for reciprocal movement longitudinally of their respective guide members; an elongated rocker arm interconnecting the followers of each pair; a trunnion mounted on the central portion of each rocker arm and extended toward its respective opposite rocker arm; a valve plate adapted for fitted engagement against the valve seat pivotally mounted on the trunnions with said trunnions substantially diametrically aligned transversely of the plate; a bridge rigidly interconnecting the rocker arms; means connected to the bridge adapted adjustably to position the bridge, rocker arms, followers and valve plate longitudinally along the guide members between a position adjacent to the valve seat and a retracted position; and means on the guide members for forcing corresponding followers of each pair of followers toward the valve seat from the plane of the guide members upon movement to the position adjacent to the valve seat whereby the rocker arms are pivoted toward the valve seat and the valve plate is forced into fitted engagement with the valve seat with the bridge, rocker arms and followers in a valve plate closing position and for retracting said corresponding followers of each pair to the plane of the guide members upon movement of the bridge, rocker arms and followers from the plate closing position to the position adjacent to the valve seat whereby the rocker arms are pivoted away from the seat and the valve plate retracted from the seat.

2. A gate valve comprising a valve seat, means mounting the seat in a predetermined plane, a valve plate adapted for fitted engagement against the valve seat, a pair of parallel elongated guide members having facing guideways disposed in a plane in substantially parallel relation to the valve seat with one of the guide members on each side of the valve seat and said guide members having corresponding ends adjacent to the valve seat and opposite ends extended from the valve seat, a pair of elongated elements pivotally mounted on the valve plate individually adjacent to the guide members for pivotal movement about substantially aligned axes transversely of the guide members and having opposite ends extended from their respective axes, guideway followers extended from the opposite ends of the elongated elements into the guideways of their respectively adjacent guide members mounting the valve plate for adjustable positioning longitudinally of the guide members, a bridge interconnecting the elongated elements for unitary pivotal movement having a central portion extended away from the valve plate, means connected to the central portion of the bridge adapted adjustably to position the bridge, followers and valve plate longitudinally of the guide members, and means adapted to stop movement of a follower on each elongated element in movement of the bridge, followers and valve plate toward the ends of the guide members adjacent to the valve seat and when the valve plate is aligned with the valve seat whereby continued movement of the central portion of the bridge, in a direction toward the ends of the guide members adjacent to the valve seat pivots the ends of the elongated elements opposite to the ends mounting the followers which are stopped, toward the valve seat and forces the valve plate against the seat, the guide members being relieved adjacent to the valve seat to accommodate movement of the followers on the pivoted ends of the elongated elements toward the seat.

3. A gate valve comprising a base plate having an opening therein for the passage of fluid therethrough, a pair of substantially parallel retainer rails mounted on the base plate in substantially erect position having lower ends on opposite sides of the opening in the base plate, means defining facing guideways along the retainer rails in substantially parallel spaced relation to the base plate, said guideways having lower ends open to the base plate, an anchor plate interconnecting the upper ends of the retainer rails having an opening therethrough in substantially equally spaced relation to the rails, an elongated screw rotatably mounted in the opening having a circumscribing flange rotatably rested on the anchor plate, a bearing plate mounted on the anchor plate in overlaying relation to the flange of the screw constraining the screw to fixed longitudinal position in the anchor plate, a valve plate engageable with the base plate in closing relation to the opening therein, a pair of trunnions rotatably mounted on the valve plate in substantially horizontal axial alignment, a pair of substantially parallel elongated rocker arms having central portions mounted on the trunnions for pivotal movement on the valve plate and opposite ends extended from the trunnions, a bridge member interconnecting the rocker arms for corresponding pivotal movement, a nut screw-threadably receiving the screw mounted in the bridge, a guideway follower mounted on each end of each rocker arm and extended into the guideway adjacent to its respective rocker arm, an ear mounted on the upper end of each rocker arm, and a stop lug mounted on each retainer rail below each of the ears and above the center of the opening in the base plate engageable by the ears when the valve plate is in juxtaposition with the opening in the base plate whereby the valve plate is raised and lowered between the retainer rails by rotation of the screw and upon continued rotation of the screw in plate lowering direction after the ears are engaged with their respective stop lugs the rocker arms are pivoted upwardly toward the base plate about their upper guideway followers to force the valve plate against the base plate in covering relation to the opening therein.

4. In an erect irrigation standpipe having an opening in a wall thereof through which irrigation water is admitted to the standpipe, a substantially rectangular base plate mounted in an erect position in the standpipe having an opening therein aligned with the opening in the standpipe, a circular valve plate of a diameter greater than the opening in the base plate positionable against the base plate in covering relation to the opening therein, a pair of trunnions journaled in substantially horizontal axial alignment in the valve plate, a pair of substantially parallel elongated rocker arms having central portions mounted on the trunnions for pivotal movement on the valve plate and opposite ends extended from the trunnions, a bridge member interconnecting the rocker arms for corresponding pivotal movement, a screw-threaded nut loosely held in the bridge, a roller horizontally extended from each end of each rocker arm, a pair of substantially parallel rails mounted on the base plate in erect position having lower ends on opposite sides of the opening in the base plate, said rails having outer erect edges extended toward each other in substantially parallel spaced relation to the base plate limiting outward movement of the rollers from the base plate to predetermined spaced relation thereto, guide bars mounted on each retainer rail receiving the rollers between said bars and the outer edges of their respective rails limiting movement of the rollers toward the base plate to predetermined spaced relation thereto, said bars having lower ends slanted inwardly toward the base plate at positions immediately above the lower rollers when the valve plate is in juxtaposition to the opening in the base plate, an ear extended from the upper end of each rocker arm toward the base plate, a pair of stop lugs mounted in fixed positions relative to the base plate for individual engagement with the ears when the valve plate is in juxtaposition to the opening in the base plate, an anchor plate interconnecting the upper ends of the retainer rails having an opening therethrough vertically aligned with the nut, an elongated erect screw loosely extended through the opening in the plate having a peripherally disposed flange rotatably rested on the anchor plate and a lower portion screw-threadedly engaged in the nut, and a bearing plate secured to the anchor plate in overlaying relation to the flange of the screw rotatably holding the screw in fixed longitudinal position in the anchor plate.

5. A gate valve comprising a valve seat, a valve plate adapted to fit against the valve seat in sealing engagement therewith, elongated rocker means pivotally mounted on the valve plate for movement about an axis centrally transversely disposed to the plate, said rocker means having ends oppositely extended from the axis, followers mounted on opposite ends of the rocker means, guide means defining paths of travel for the followers between positions substantially aligned with the valve seat and retracted positions, the path of travel for the follower at one end of the rocker means being substantially parallel to the seat throughout the length of said path and the path of travel for the follower at the opposite end of the rocker means being substantially parallel to said valve seat from retracted to said aligned position and adjacent to said aligned position being directed toward the valve seat, and means connected to the rocker means for pivotal movement relative thereto in spaced relation to said axis transversely disposed to the plate for controllably positioning the followers with the rocker means and valve plate carried thereby between said retracted and aligned positons whereby the rocker means is pivotally positioned to move the valve plate to and from engagement with the valve seat as the followers correspondingly traverse their respective paths.

6. A gate valve comprising a valve seat, a valve plate adapted to fit against the valve seat in closing relation thereto, rocker means pivotally mounted on the valve plate on the side thereof opposite to the valve seat for movement about an axis centrally transversely of the plate, the rocker means having ends oppositely transversely extended from said axis, coacting guide and follower means, one thereof being mounted in fixed relation to the valve seat and the other being mounted on the rocker means for guiding the rocker means and valve plate between a closing position with the plate aligned with the seat and a retracted position with the plate laterally removed from the seat, said coacting guide and follower means being disposed on opposite sides of the valve seat and the valve plate defining an elongated path of travel for one end of the rocker means substantially parallel to the seat throughout the length of said path and defining a path of travel for the opposite end of the rocker means substantially parallel to said valve seat from retracted position to a position adjacent to said closing position and thence toward the valve seat, and actuating means connected to the rocker means for movement of the rocker means and valve plate between said closing and retracted positions and connected to the rocker means for pivotal movement relative thereto intermediate opposite ends of said rocker means, the actuating means being connected to the rocker means in spaced relation to the valve plate and the pivotal axis of the rocker means lying between the valve plate and said pivotal connection of the actuating means.

7. A gate valve comprising a valve seat, means mounted on opposite transverse sides of the valve seat having substantially parallel guideways therein extended from positions adjacent to the valve seat to positions transversely retracted from the seat, a pair of spaced followers respectively mounted in each guideway for reciprocal movement longitudinally of their respective guideways, rocker means interconnecting the followers for corresponding travel longitudinally of their guideways, a valve plate adapted for fitted engagement against the valve seat pivotally mounted on the rocker means for tilting movement relative thereto about an axis substantially diametrically of the plate, control means connected to the rocker means in spaced relation to the followers with the followers between the control means and the valve plate adapted adjustably to position the rocker means, followers and valve plate longitudinally along the guideways between a position adjacent to the valve seat and a retracted position, and stop means engageable with the rocker means at a position spaced from the control means toward the valve seat and spaced from the tilting axis of the valve plate in the direction of transverse extension of the guideways from the valve seat.

8. A gate valve comprising a valve seat, a valve plate adapted to fit against the valve seat, elongated rocker arms pivotally mounted on the plate for pivotal movement around a common axis and each having opposite ends oppositely extended transversely from the common axis, means on opposite sides of the valve seat providing substantially parallel guideways therein extended from positions on opposite sides of the valve seat to positions transversely retracted from the seat, followers mounted on said opposite ends of the rocker arms in spaced relation to the valve plate operatively associated with the guideways, a bridge member rigidly interconnecting the rocker arms, and actuating means connected to the bridge member in more greatly spaced relation to the valve plate than the followers for pivotal movement of the bridge member relative to the actuating means for adjustable positioning of the bridge member, rocker arms, followers, and valve plate along the guideways, said guideways receiving and guiding the followers for movement of the plate between a retracted position and a position fitted against the seat and pivoting corresponding ends of the rocker arms toward the seat upon movement of the plate to fitted engagement against the seat whereby the plate is pressed against the seat by the leveraging action of the rocker arms.

9. A gate valve comprising a substantially circular valve seat, a substantially circular valve plate adapted for fitted engagement against the valve seat, rocker means pivotally mounted on the valve plate for movement about an axis substantially diametric to the plate and having ends oppositely extended transversely from said axis, guide means located in a plane in substantially parallel spaced relation to the valve seat, followers operatively associated with the guide means for reciprocal movement therealong mounted on the opposite ends of the rocker means, actuating means adapted adjustably to position the rocker means, followers, and valve seat longitudinally along the guide means between a position with the valve plate juxtaposed to the valve seat and a position retracted therefrom, the actuating means being connected to the rocker means in spaced relation to the valve plate for pivotal movement relative thereto, the followers being mounted on the rockers between the valve plate and the actuating means, and stop means engageable with the rocker means at a position spaced from the actuating means toward the valve plate and spaced from the pivotal axis of the rocker means on the valve plate in the direction of the retracted position of the rocker means, followers, and valve plate from the valve seat whereby the valve plate is leveraged into seat engagement upon continued movement of the actuating means toward said juxtaposed position and pivotal movement of the rocker means about the stop means.

10. A gate valve comprising a valve seat mounted in a substantially erect position, a valve plate adapted for fitted engagement against the valve seat, a pair of aligned trunnions oppositely horizontally extended from the valve plate at substantially diametrically related positions thereon and in spaced relation to the valve plate and on the side of the valve plate opposite to the valve seat side, a pair of substantially parallel rocker arms individually pivotally mounted on the trunnions each having an upwardly extended end and a downwardly extended end, upper followers individualy mounted on the upper ends of the rocker arms and horizontally extended therefrom, lower followers individually mounted on the downwardly extended ends of the rocker arms and horizontally extended therefrom, means for raising and lowering the rocker arms and valve plate between a position adjacent to the valve seat and a retracted position upwardly therefrom, said means being connected to the rocker arms for pivotal movement relative thereto at a position spaced from the valve plate a distance greater than the spacing of the trunnions from said plate and on the same side of the plate as the trunnions, and guide means operatively associated with the followers guiding the upper followers in a substantially erect rectilinear path of movement in spaced relation to the valve seat and the lower followers in substantially the same rectilinear path between retracted position of the valve plate and a position of the plate adjacent to the valve seat at which the path of the lower followers is angularly directed toward the valve seat, the guide means including stop means limiting lowering movement of the rocker arms when the valve plate is in said lowered position adjacent to the valve seat.

References Cited in the file of this patent

UNITED STATES PATENTS

| | | |
|---|---|---|
| 653,600 | Wiley | July 10, 1900 |
| 989,202 | Snow | Apr. 11, 1911 |
| 1,074,199 | Poland | Sept. 30, 1913 |
| 1,325,303 | McGill | Dec. 16, 1919 |
| 1,328,752 | Moody | Jan. 20, 1920 |
| 1,592,986 | Martin | July 20, 1926 |
| 1,830,999 | Harwood | Nov. 10, 1931 |